United States Patent [19]

Hazenbroek

[11] 4,395,795
[45] Aug. 2, 1983

[54] POULTRY GIZZARD PROCESSING SYSTEM

[76] Inventor: Jacobus E. Hazenbroek, Burg de. Zeeuwstraat 52, Numansdorp, Netherlands

[21] Appl. No.: 241,606

[22] Filed: Mar. 9, 1981

[51] Int. Cl.³ .......................................... A22C 21/00
[52] U.S. Cl. ........................................ 17/52; 17/11
[58] Field of Search ................................. 17/11, 52

[56] References Cited

U.S. PATENT DOCUMENTS

| | | | |
|---|---|---|---|
| 2,787,362 | 4/1957 | Hill | 198/33 |
| 3,076,998 | 2/1963 | Harben | 17/11 |
| 3,172,148 | 3/1965 | Hill | 17/11 |
| 3,411,828 | 11/1968 | Hill | 302/14 |
| 3,624,669 | 11/1971 | Lewis | 17/11 |
| 3,930,283 | 1/1976 | Martin | 17/11 |
| 4,057,875 | 11/1977 | Hill | 17/43 |
| 4,073,040 | 2/1978 | Hill | 17/43 |
| 4,183,117 | 1/1980 | Meyn | 17/11 |
| 4,203,178 | 5/1980 | Hazenbroek | 17/50 |
| 4,249,284 | 2/1981 | Graham et al. | 17/52 |
| 4,325,165 | 4/1982 | De Long | 17/11 X |

*Primary Examiner*—Willie G. Abercrombie
*Attorney, Agent, or Firm*—George M. Thomas

[57] ABSTRACT

Poultry gizzards with gut and stomach attached thereto are moved in sequence along a processing path, first along a pair of helically threaded conveyor rolls which supports the gizzards and permits the stomach and gut to hang freely below the gizzards between the conveyor rolls and then along a pair of engaging cutting rolls which separate the gut and stomach from the gizzard. The gizzards are transferred to a trough where a water flume transfers the gizzards to a chain conveyor. The chain conveyor transports the gizzards beneath a stationary elongated knife which progressively cuts into the upper surfaces of the gizzards and a presser fork straddling the knife spreads the cut apart portions of the gizzards as the gizzards move along the knife, and rotary brushes further spread the cut apart portions of the gizzards to remove the debris. The gizzards are dropped to peeling rolls for removing the lining from the gizzards.

15 Claims, 12 Drawing Figures

_Fig_ 5

_Fig_ 8

_Fig_ 6

POULTRY GIZZARD PROCESSING SYSTEM

BACKGROUND OF THE INVENTION

This invention relates to improvements in processing poultry gizzards, wherein gizzards that have been extracted from chickens or other poultry with gut and stomach still attached thereto are moved through a processing path where the gut and stomach are separated from the gizzards, the gizzards are cut or "split" and loose material removed therefrom, and the gizzards are peeled.

In the past the viscera has been removed from poultry and processed separately. For example, the gizzard, gut and stomach are separated from the other viscera, and the gut and stomach are separated from the gizzard, the gizzard is split, and the lining is peeled from the gizzard. Prior art patents which disclose various equipment for processing poultry gizzards include U.S. Pat. Nos. 3,172,148, 3,480,991, 3,990,128, 4,057,875, 4,073,040, 4,074,390, 4,183,117 and 4,203,178.

Prior art poultry gizzard processing equipment generally include an initial conveyor mechanism that supports and moves the gizzard along the beginning of the processing path while permitting the stomach and gut to hang freely by their own weight beneath the gizzard, a separating mechanism that separates the gut and stomach from the gizzard as the gizzard continues to be moved along the processing path, and a rotary disc cutter that cuts into the gizzard to "split" the gizzard. The gizzard is then transferred to a pair of helically threaded peeler rolls which engage and strip the lining from the gizzard.

The prior art gizzard processing equipment most often malfunctions when the gizzards are fed to the system too rapidly so that the stomach and gut on gizzards are intermingled, resulting in the gizzards being improperly oriented in the equipment and the gut and stomache being improperly separated from the gizzards, and in the gizzards being improperly oriented as they approach the cutter, causing a "cross-cut". Another common malfunction in the prior art gizzard processing equipment is that the rotary disc cutter becomes damaged by the hard particles that are sometimes present in gizzards, and when the cutting blade becomes dull it must be replaced or the gizzards will be improperly cut. Also, the hard objects present in gizzards occasionally collide with the rotary disc cutter and cause the gizzards to become misaligned in the system and improperly cut.

Another problem in the operation of gizzard processing equipment is contamination of the gizzards. The health regulations of the United States and other countries require the gizzards to be processed in sanitary conditions, as by maintaining the equipment during its operation in clean condition as by continuously flushing the operative elements of the equipment with streams of water and using different streams of water in different stages of the process.

SUMMARY OF THE INVENTION

Briefly described, the present invention comprises a method and apparatus for processing poultry gizzards wherein the gizzards, with gut and stomach attached thereto, are received and oriented with the stomachs and gut suspended below the gizzards and with the portion of the gizzard to which the stomach is attached oriented downwardly. The gizzards are moved by a pair of parallel helically threaded conveyor rolls in sequence to a pair of parallel helically threaded cutting rolls whereupon the gut and stomach are separated from the gizzards. The gizzards are flumed from the cutting rolls to the cutting station where they are received in sequence on a chain conveyor and moved along a stationary cutting blade where they are progressively split. The split gizzards are moved from the sharpened portion of the cutting blade along the guide portion of the cutting blade by the chain conveyor and rotary brushes engage the cut apart portions of the gizzards to dislodge and remove the loose contents that may be in the gizzards. The gizzards are subsequently dropped onto a pair of counter rotational peeler rolls whereupon the gizzards are peeled.

Thus, it is an object of this invention to provide an improved method of processing poultry gizzards, wherein the gizzards are accurately and reliably separated from their attached stomachs and gut, the gizzards are split, and the loose matter within the gizzards is removed.

Another object of this invention is to provide improved apparatus for processing poultry gizzards, which apparatus is effective to rapidly and accurately remove the stomach and gut from each gizzard, to accurately split each gizzard and to clean each gizzard.

Another object of this invention is to provide a cutter assembly for a poultry gizzard processor which accurately cuts the gizzards and which is not easily damaged by the contents of the gizzards.

Another object of this invention is to provide a poultry gizzard processing system which is sanitary, which operates to reliably and rapidly remove the stomach and gut from the gizzard and to split the gizzard and which includes a durable cutter assembly.

Other objects, features and advantages of the present invention will become apparent upon reading the following specification, when taken in conjunction with the accompanying drawings.

DETAIL DESCRIPTION OF AN EMBODIMENT

Figure 1:
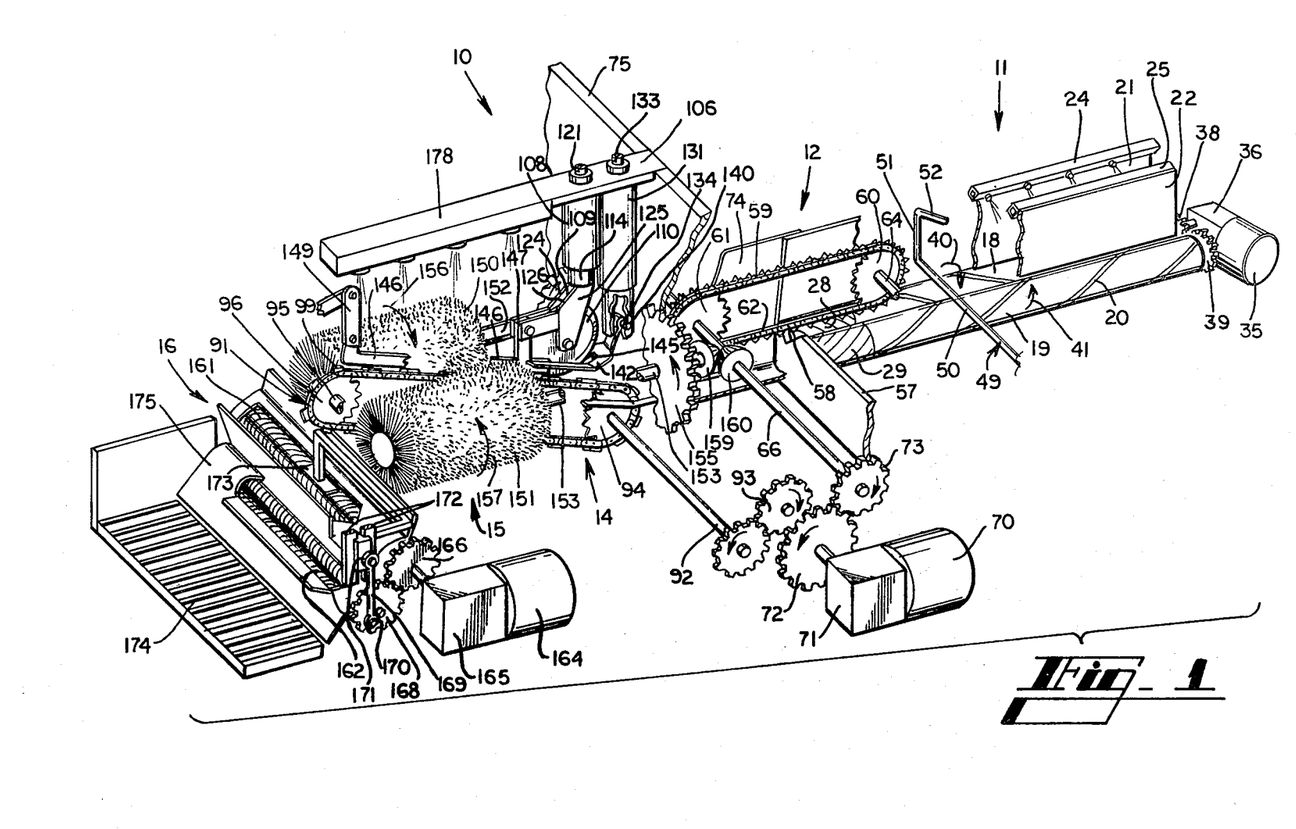
FIG. 1 is a schematic perspective illustration of the poultry gizzard processing apparatus.

Referring now in more detail to the drawings, in which like numerals indicate like parts throughout the several views, FIG. 1 illustrates a poultry gizzard processing apparatus 10 which includes in sequence an infeed station 11, separating station 12, transfer station 13, cutting station 14, cleaning station 15, and peeling station 16.

Figure 2:
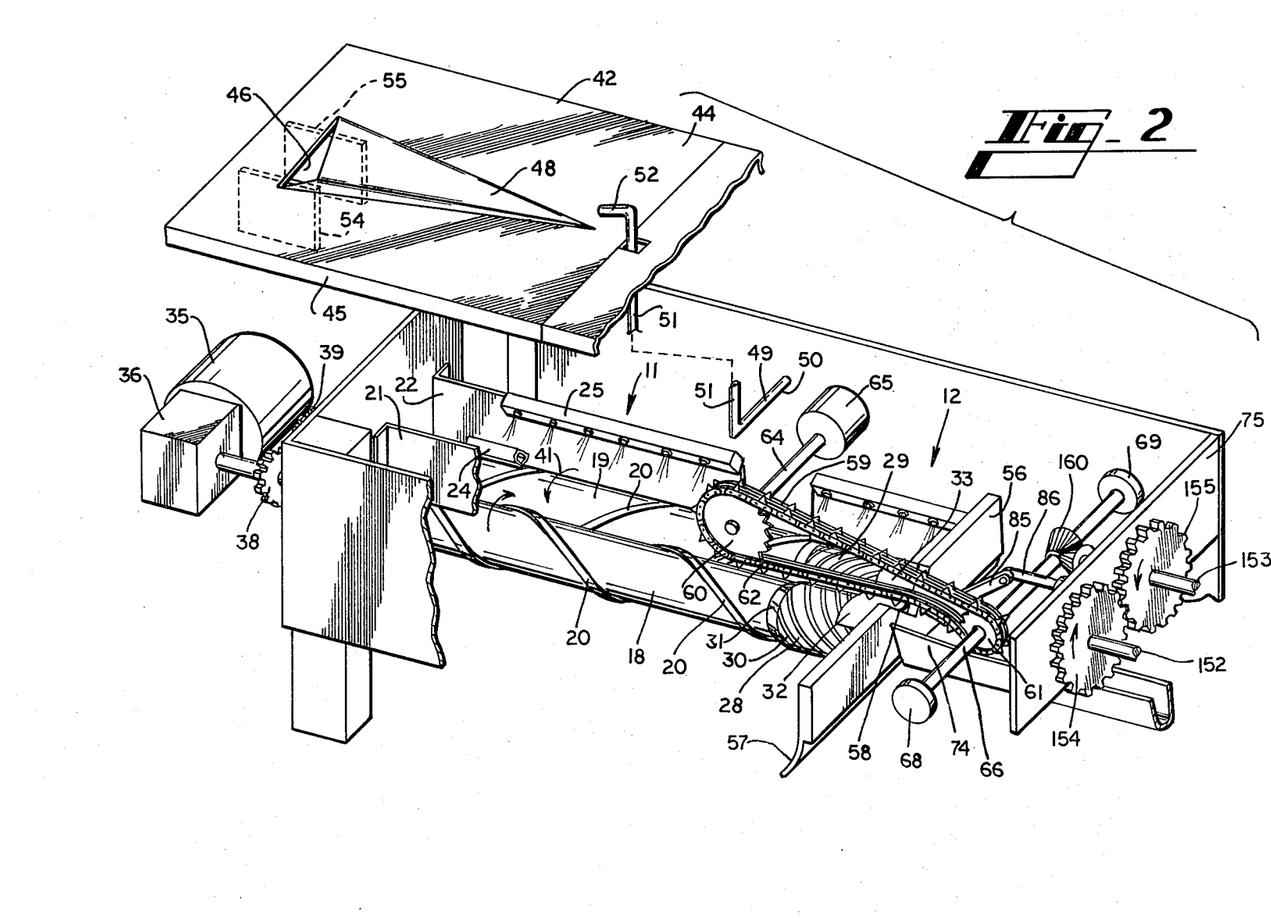
FIG. 2 is a schematic perspective illustration of the infeed station of the poultry gizzard processing apparatus, showing parts broken away for clarity and showing the cover in a removed position.

As illustrated in FIG. 2, infeed station 11 comprises a pair of closely spaced, parallel conveyor rolls 18 and 19 which are rotatably supported at their ends and each of which includes a plurality of helical threads 20. The helical threads 20 of conveyor roll 18 are oppositely threaded with respect to the helical threads 20 of conveyor roll 19. The threads 20 are arranged so that when the adjacent surfaces of the conveyor rolls 18 and 19 move downwardly, the threads urge gizzards positioned on the conveyor rolls from the infeed station to the separator station 12. A pair of vertical guide plates 21 and 22 are oriented parallel with respect to each other and are positioned over and extend along the lengths of conveyor rolls 18 and 19. Water conduits 24 and 25 are supported at the upper edges of guide plates 21 and 22 and are arranged to direct a spray of water downwardly between the guide plates and onto the top surfaces of conveyor rolls 18 and 19.

Conveyor rolls 18 and 19 terminate in cutting rolls 28 and 29, respectively. Cutting rolls 28 and 29 are also helically threaded with a plurality of sharp cutting threads, and the threads of cutting rolls 28 and 29 protrude to a larger diameter than the threads 20 of conveyor rolls 18 and 19, with the helical cutting threads 30 of the cutting rolls 28 and 29 in engagement with each other, so that the cutting threads 30 of cutting roll 29 cause rotation of the cutting roll 28 and conveyor roll 18 when conveyor roll 19 is rotated. The cutting threads 30 of the cutting rolls 28 and 29 are beveled at 31 adjacent the conveyor rolls 18 and 19. Conveyor motor 35 is mounted outside the housing of the infeed station 11 and through gear box 36 rotates drive sprocket 38. Drive sprocket 38 rotates conveyor roll sprocket 39 which is rigidly mounted to the end of conveyor roll 19. Thus, when conveyor roll 19 is rotated by motor 35, its cutting roll 29 rotates in unison therewith, and the engaging cutting threads 30 of cutting rolls 28 and 29 cause rotation of cutting roll 28 and conveyor roll 18. The direction of rotation is indicated by arrows 40 and 41.

Infeed station cover 42 includes top wall 44 and downwardly turned edges 45 which fit about the housing for infeed station 11. Infeed opening 46 is formed in top wall 44 and inclined trough 48 extends toward infeed opening 46. Water conduit 49 is supported by the housing and includes lateral leg 50 extending into the housing, upwardly extending leg 51 that protrudes upwardly through the cover of the housing and downwardly inclined leg 52 that is normally directed toward inclined trough 48 of top wall 44. Baffle plates 54 and 55 are positioned on opposite sides of infeed opening 36 and are attached to the bottom surface of top wall 44 of infeed station cover 42. The baffle plates 54 and 55 are spaced apart a distance less than the spacing of guide plates 21 and 22 and extend downwardly from top wall 44 a distance so that they are telescopically received between guides plates 21 and 22 when cover 42 is properly placed on the housing.

First separator wall 56 is supported at its ends by the housing and rotatably supports conveyor rolls 18 and 19 and cutting rolls 28 and 29. First separator wall 56 includes a downardly extending skirt 57 that is angled downardly away from transfer station 13 toward separating station 12. Separator wall 56 includes an approximately V-shaped notch 58 centrally in its upper portion, in alignment with the approximately V-shape formed by the upper converging surfaces of the cutting rolls 28 and 29. The hemi-cylindrical shields 32 and 33 also merge together at their adjacent edges and form a shape that conforms to the V-shaped notch 58. Thus, the gizzards moving along the V-shape converging surfaces of the cutting rolls 28 and 29 will move onto the shields 32 and 33 and then through the V-shaped notch 58.

Chain conveyor 59 is supported by conveyor sprockets 60 and 61 and includes a lower flight 62 that extends across cutting rolls 28 and 29, through V-shaped notch 58 and beyond first separator wall 56. Conveyor sprocket 60 is supported by shaft 64, and shaft 64 is supported by bearing 65 mounted to the housing. Sprocket 61 is mounted on shaft 66, and shaft 66 is rotatably supported at one end by bearing 68 and at the other end by bearing 69. Drive motor 70 is located outside the housing and drives shaft 66 through gear box 71, drive sprocket 72 and driven sprocket 73.

Figure 3:
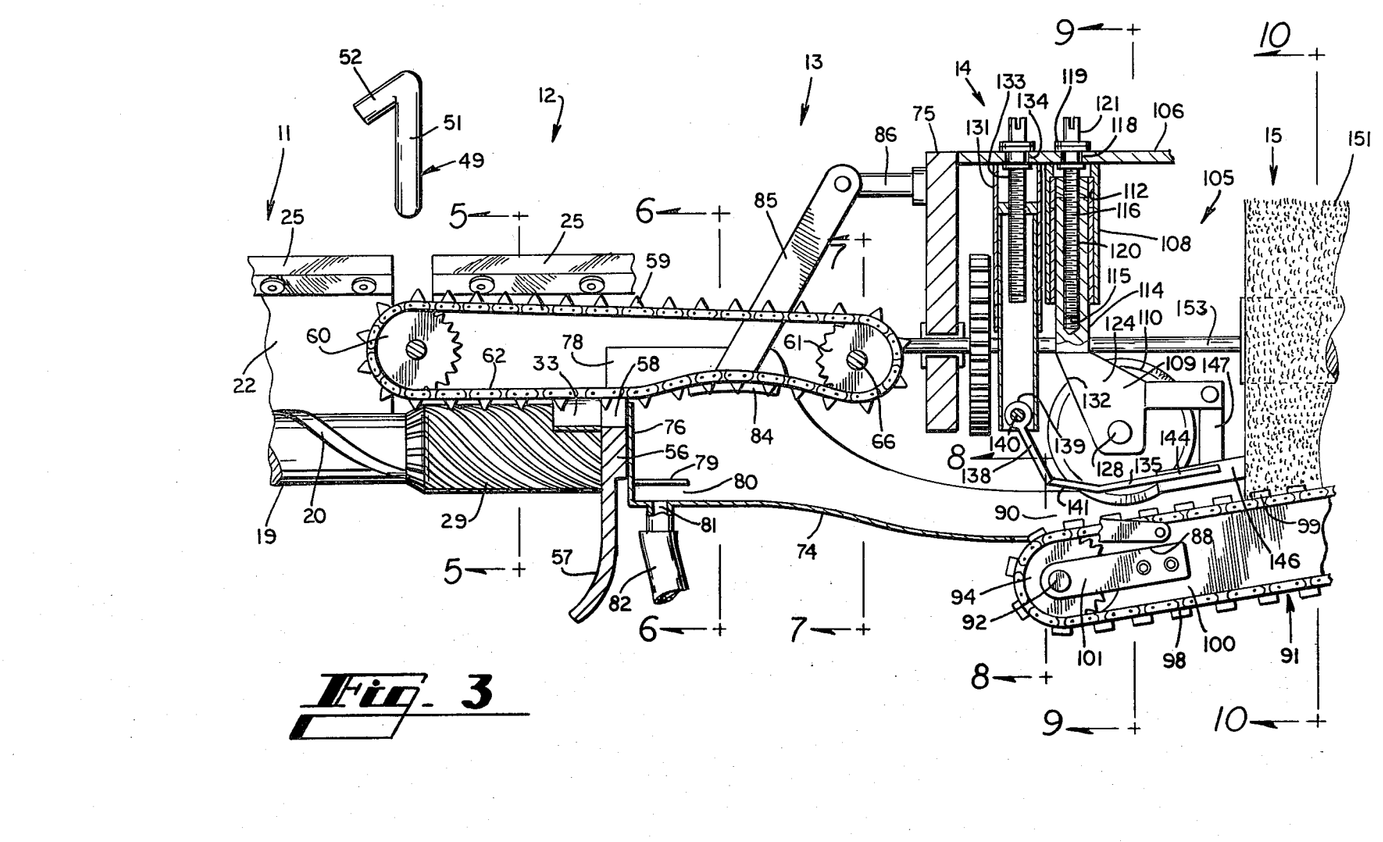
FIG. 3 is a side cross-sectional view of the transfer station of the poultry gizzard processing apparatus.

Transfer trough 74 extends through transfer station 15 and is approximately V-shaped in cross-section. Transfer trough 74 abuts first separator wall 56 adjacent cutting rolls 28 and 29 and extends along the processing path in a downwardly inclined direction beneath the lower edge portion of second separator wall 75 to cutting station 14. Transfer trough 74 is closed by end wall 76 which abuts first separator wall 56 and includes overlying protrusions 78 that rest on the upper surface of first separator wall 56. Horizontal baffle 79 is rigidly connected to the sides of the transfer trough 74 and to end wall 76 so as to form a flume opening 80 that faces in the downstream direction of the transfer trough 74. Baffle 79 also rigidifies the trough structure. Water supply opening 81 is formed in the bottom portion of transfer trough 74 beneath baffle 79 and a water supply conduit 82 is connected to the water supply opening 81. When water is moved upwardly through the water supply conduit through water supply opening 81, the water is required by baffle 79 to change directions and move out in a lateral direction through flume opening 80 and move down the length of transfer trough 74, through transfer station 13 toward cutting station 14.

Slider shoe 84 is located in the path of the lower flight 62 of chain conveyor 59, and slider shoe 84 is adjustably supported by support arm 85 that is pivotally mounted at its upper end on stationary support 86. The position of slider shoe 84 can be adjusted by moving support arm 85 so as to loosen or tighten chain conveyor 59 and to prevent excessive drag of the lower flight 62 of the chain conveyor across the shields 32 and 33 and the V-shaped notch 58 at the delivery ends of the cutting rolls 28 and 29.

Figure 4:
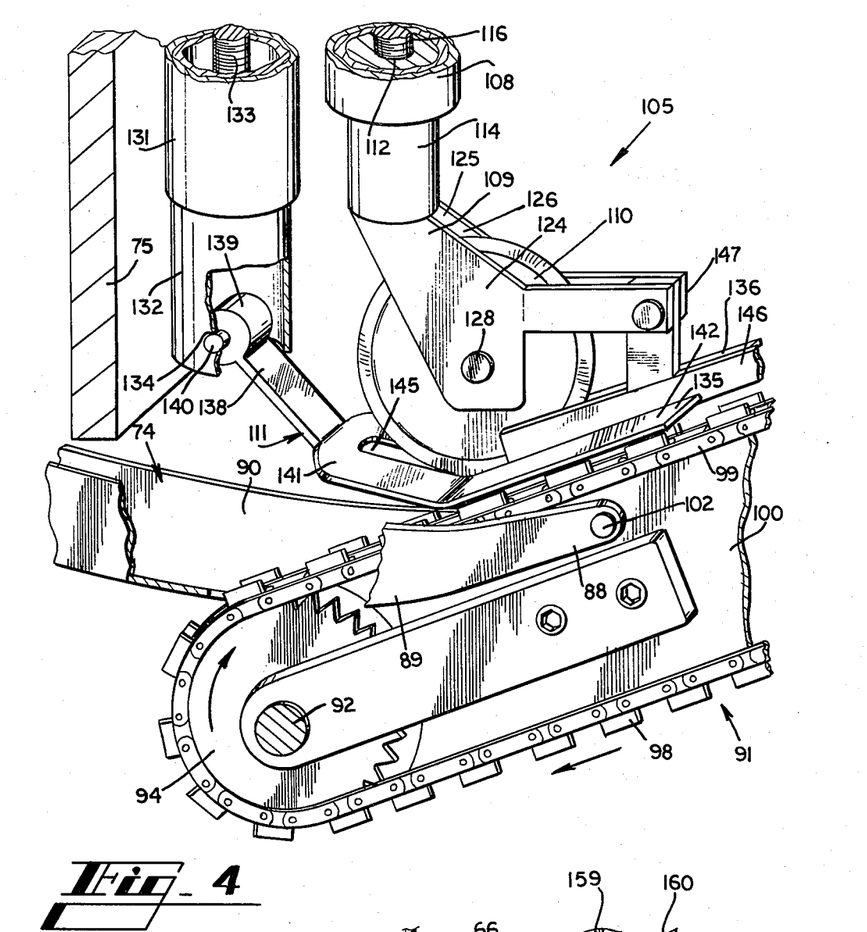
FIG. 4 is a perspective detail illustration of the cutter assembly.

As illustrated in FIGS. 3 and 4, the lower distal end 88 of transfer trough 74 is bifurcated and includes guide plates 89 and 90 which straddle the chain conveyor 91 in cutting station 14. Chain conveyor 91 includes lower axle 92, lower chain sprocket 94, upper axle 95 and upper sprocket 96. Axle 92 of chain conveyor 91 is driven from motor 70 through gear box 71, drive sprocket 72, idler sprocket 93 and the lower axle sprocket. Continuous conveyor chain 98 extends about the lower and upper sprockets 94 and 96 and includes an upper conveying flight 99. Chain guide 100 extends between the flights of the conveyor chain and keeps the upper flight 99 from sagging between sprockets 94 and 96. Braces 101 are positioned on opposite sides of each sprocket 94 and 96 and extend about axles 92 and 95 and are rigidly connected to chain guide 100 to rigidly support the chain guide between the sprockets 94 and 96. The guide plates 89 and 90 at the lower distal end 88 of transfer trough 74 are positioned above the braces 101 on opposite sides of the chain guide 100, and positioning screws 102 extend through each of the guide plates 89 and 90 and bear against chain guide 100 to properly locate the guide plates 89 and 90 from the upper conveying flight 99 of the continuous chain conveyor.

Cutter assembly 105 is located in cutting station 14 and includes horizontal support strap 106 (FIG. 3) which is rigidly mounted to second separator wall 75, support socket 108, knife support clevis 109, knife 110 and presser fork 111. Support socket 108 is rigidly mounted at its upper end to horizontal support strap 106 and defines an internal bore 112 extending therethrough. Blade support clevis 109 includes an upwardly extending support shaft 114 that defines an internally threaded bore 115 extending downwardly therein. Positioning screw 116 extends downwardly through opening 118 of horizontal support strap 106, and includes an enlarged non-circular head 119 on top of support strap 105 and an externally threaded shaft 120 which is received in the interally threaded bore 115 of support shaft 114. Nob 121 is attached to the non-circular head 119 of positioning screw 116, and when nob 121 is rotated, positioning screw 116 is turned and causes knife support clevis 109 to move up or down.

As illustrated in FIG. 4, knife support clevis 109 is bifurcated and includes a pair of spaced parallel ears 124 and 125 that define a slot 126 therebetween and disc shaped knife 110 is received in slot 126. A bolt 128 extends through knife 110 and clevis 109. Thus, knife 110 is clamped by bolt 128 in a stationary position, but when bolt 128 is loosened, the knife 110 can be rotated in order to move a sharper portion of the knife into the cutting position.

Presser fork 111 is supported at its upper end by stationary support bracket 131 mounted at its upper end to support strap 106 and telescoping support socket 132 received in socket 131, and externally threaded positioning screw 133 extends downwardly through opening 134 of support strap 106 and its threads engage the internal threads of telescoping support socket 132. Presser fork 111 is a bifurcated fork structure that includes a pair of spaced apart tines 135 and 136 that are joined together at one end to a support shank 138. Support shank 138 includes a socket 139 at its upper end with a pivot pin 140 extending through the socket. The ends of the pivot pin also protrude through the laterally aligned openings 134 of support telescoping support socket 132.

The tines 135 and 136 of presser fork 111 are each shaped so as to include a base section 141 and a distal section 142. A slot 145 is formed between the tines 135 and 136 so that the tines straddle knife 110, and the slot 145 is closed at its upper end adjacent support shank 138 and is open at its other end so that the tines can move up about knife 110. Normally, the tines 135 and 136 will rest against the upper edge portions of the guide plates 89 and 90 of transfer trough 74. The edge portion of the knife 110 which is received in slot 145 of presser fork 111 is sharpened for the purpose of cutting or "splitting" the poultry gizzards which move through the processing system. A guide rail 146 is supported at one of its ends by L-shaped adjustable bracket 147 from blade support clevis 109. Guide rail 146 extends beyond presser fork 111, is not sharpened and functions as a rail or guide for directing the movement of the cut gizzards on through the cleaning station 15.

As illustrated in FIG. 1, the portion of guide rail 146 that extends beyond presser fork 111 is sloped in an upward direction along the upper flight 99 of chain conveyor 91, and the upper end portion of guide rail 146 is supported by bracket 149. A pair of rotary brushes 150 and 151 are located in cleaning station 15. The brushes 150 and 151 are rigidly mounted to axles 152 and 153, and each axle is rigidly connected at one end to enlarged sprockets 154 and 155, respectively. The sprockets 154 and 155 engage each other, so that the rotary rushes 150 and 151 rotate in opposite directions of rotation as indicated by direction arrows 156 and 157. Axle 153 extends through second separator wall 75 and a mitre gear 159 is mounted on its distal end. A second mitre gear 160 is mounted on axle 66, so that motor 70 functions to rotate rotary brushes 150 and 151.

Rotary brushes 150 and 151 extend horizontally through cleaning section 15 and the upper conveying flight 99 of the chain conveyor 91 is inclined upwardly with the guide rail 146 between the rotary brushes. Therefore, the gizzards transported by chain conveyor 91 progress upwardly along the bottom edge of guide rail 146 through the rotary brushes.

As illustrated in FIG. 1, peeling station 16 is located at the end of and below chain conveyor 91. Two pair of helically threaded gizzard peeler rolls 161 and 162 are rotatably driven by drive motor 164, gear box 165 and sprockets 166 and 168. The sprockets 166 and 168 engage each other and are each connected to an end portion of one of each of the pair of gizzard peeler rolls 161 and 162, and the engaging helical teeth of the pairs of peeler rolls cause the driven peeler roll to drive the other peeler roll of each pair. Crank arm 169 is connected at its lower end to a crank pin 170 of sprocket 168, and is connected at its upper end to slide block 171. Slide block 171 reciprocates vertically between vertical guides 172 in response to the rotation of sprocket 168. Presser foot 173 is mounted on slide block 171 and is suspended over the upper pair of peeler rolls 161. When the peeler rolls are rotated by motor 164 and a gizzard moves off the end of chain conveyor 91 over sprocket 96 and lands on the first pair of peeler rolls 161, the helical threads of the peeler rolls 161 progressively move the gizzard toward presser foot 173, so that the gizzards move beneath the reciprocating presser foot 173 and are urged downwardly into engagement with the teeth of the peeler rolls. This tends to press the lining of the gizzards into the teeth of the peeler rolls, so that the peeler rolls bite into and pull the lining from the gizzards. When the gizzards emerge from beneath the presser foot 173 they are moved to the sloped end 171 of the cover of the first pair of peeler rolls 161, so that they are moved under the influence of gravity in a downward direction onto the second pair of peeler rolls 162. A work grate 174 is located adjacent the second pair of peeler rolls 162 and a worker usually stands adjacent the work grate so as to inspect the gizzards as they emerge from the poultry gizzard processing system. As the gizzards move onto the second pair of peeler rolls 162 they usually are moved by the helical teeth of the peeler rolls to the sloped end of the cover tray 175, and then are moved under the influence of gravity down the slope of the cover onto the work grate 174. In the meantime, the worker can inspect the gizzards and manually re-peel the gizzards if necessary, by urging the gizzards against the second pair of peeler rolls 162. If the worker should leave her position adjacent work grate 174, the gizzards will accumulate on the work grate, and when the worker returns the unpeeled gizzards can be manually peeled by the worker and the properly peeled gizzards can be removed by the worker to a subsequent work station.

Figures 5, 8:
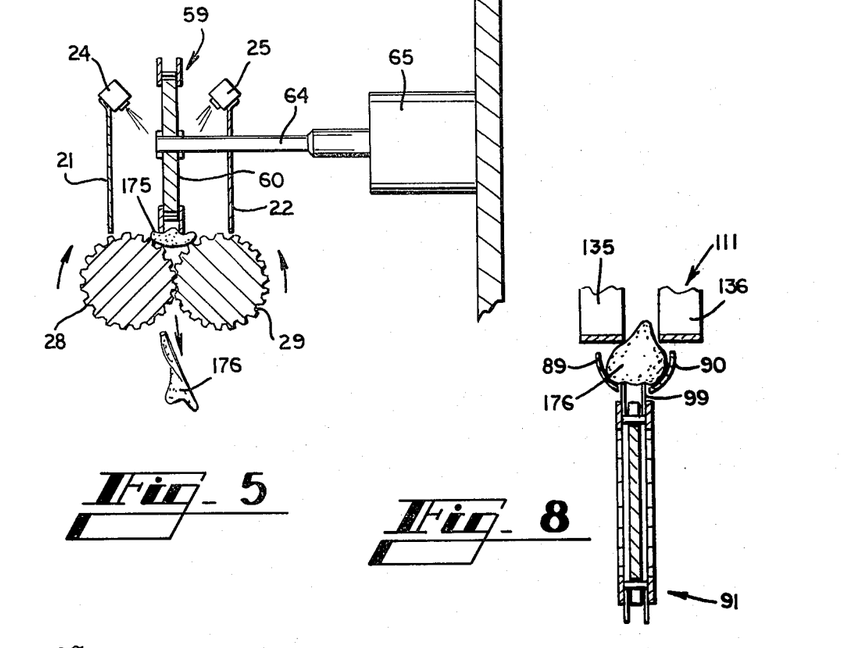
FIG. 5 is an end view, taken along lines 5—5 of FIG. 3, of the cutting rolls.
FIG. 8 is an end view, taken along line 8—8 of FIG. 3, of the end of the transfer trough and the beginning of the cutter assembly.
Figure 6:
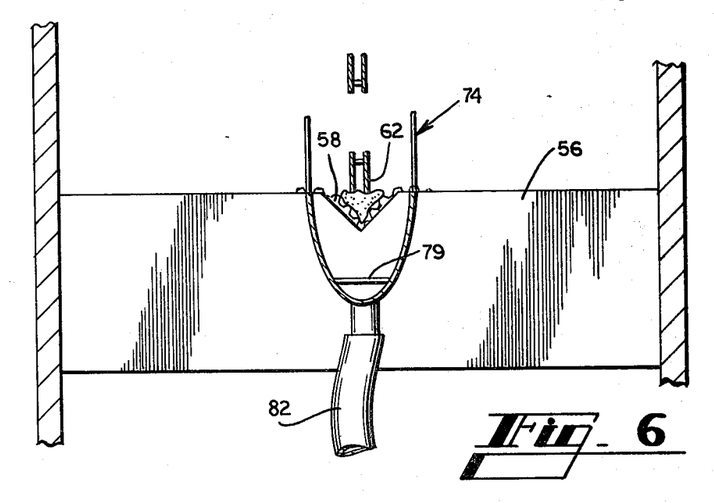
FIG. 6 is an end view, taken along lines 6—6 of FIG. 3, of the transfer trough.
Figure 7:
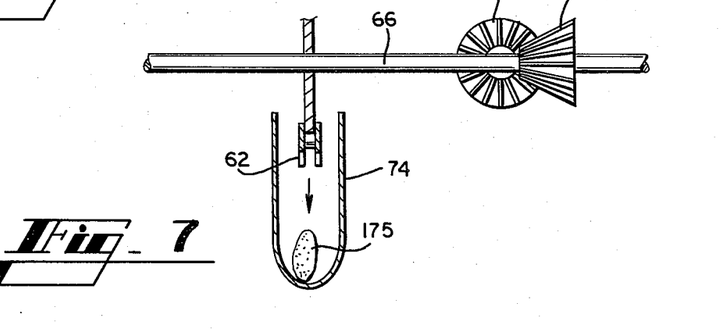
FIG. 7 is an end view, taken along lines 7—7 of FIG. 3, of the transfer trough.

As illustrated in FIG. 5, when the gizzards 175 have been transported across the conveyor rolls 18 and 19 and are engaged by the chain conveyor 59 and carried across the V-shaped recess between the engaging cutting rolls 28 and 29, the stomach and gut 176 are pulled and cut from the gizzard 175 by the engaging teeth 30. The chain conveyor 59 exerts a downward force against the gizzards 175 so that the area of the gizzard to which the stomach and gut 176 are attached is positively biased into engagement with the cutting teeth of the cutting rolls 28 and 29, thus assuring that a proper separation is made of the stomach and gut from the gizzard. The chain conveyor 59 also assures that the gizzards 175 will not inadvertently stop or slow down in their movements across the cutting rolls, and the gizzards 175 are moved on through the V-shaped notch 58 in first separator wall 56 and then are released and dropped by the chain conveyor into transfer trough 74 (FIG. 7). A flume of water flows underneath baffle 79 and washes the gizzards 175 through the transfer trough on over to chain conveyor 91.

Figure 9:
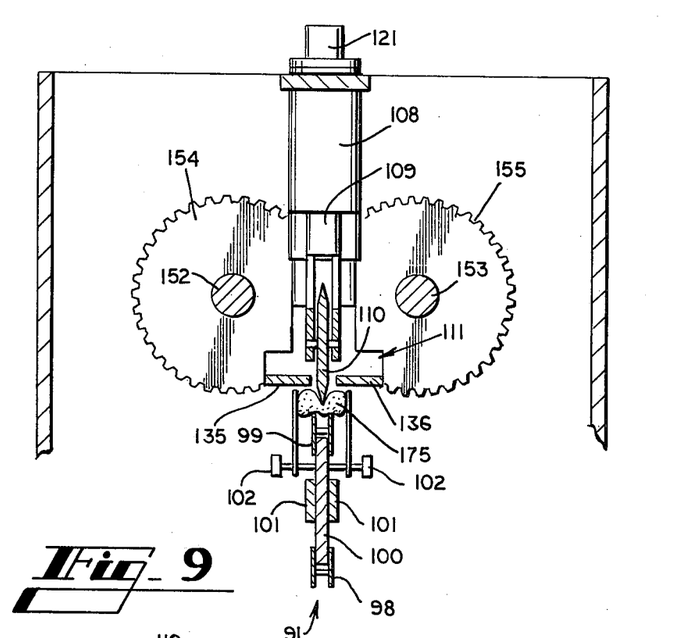
FIG. 9 is an end view, taken along lines 9—9 of FIG. 3, of the cutter assembly.
Figure 9A:
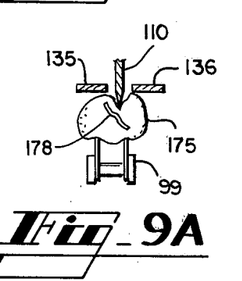
FIGS. 9A and 9B are progressive detail illustrations of the cutter and a gizzard as it is cut by the cutter.
Figure 9B:
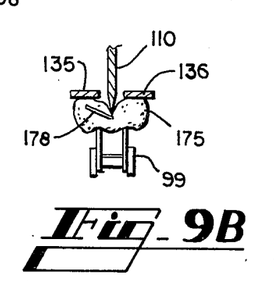

As illustrated in FIG. 8, the gizzards 175 are engaged by the spiked teeth of the upper conveying flight 99 of the chain conveyor 91 at a position between the guide plates 89 and 90 of the transfer trough 74. The tines 135 and 136 of the presser fork 111 engage the upper portion of the gizzard 175 to stabilize the gizzard as it moves with the chain conveyor 91, and as the gizzard moves beneath the sharpened edge of the knife 110 (FIG. 9), the tines 135 and 136 tend to spread the cut apart portions of the gizzard 175 so as to expose any loose matter or debris contained within the gizzard. As illustrated in FIGS. 9A and 9B, the knife 110 does not rotate and the cut made into the gizzard 175 is by compression of the gizzard against the sharp edge of the knife and the movement of the gizzard along the edge of the knife. The compression of the gizzard during the cutting of the gizzard appears to result in the hard objects in the gizzard such as object 178 to be engaged gradually by the knife 110, instead of being impacted by the knife.

Figure 10:
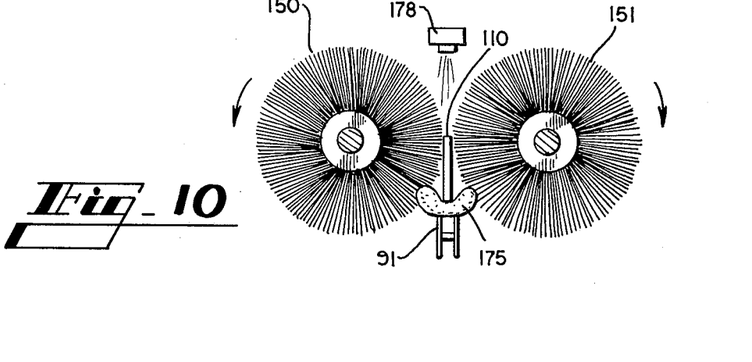
FIG. 10 is an end view, taken along lines 10—10 of FIG. 3, of the cleaning section.

As the gizzard moves beyond the sharpened portion of knife 110, the guide rail 146 tends to guide the cut gizzard 175 as it moves on the upper flight of chain conveyor 91 between brushes 151 and 152, where the cut apart portions of the gizzard are engaged by the bristles of the brush, vibrated and the relative movement of the gizzard 175 with respect to the brush bristles and with respect to the guide rail 146 tend to dislodge the hard particles within the gizzard. A water spray is directed downwardly from header 178 so as to wash the gizzards and brush bristles, further creating a cleansing action with respect to the gizzards.

When the gizzards reach the end of chain conveyor 91, they are moved over the upper end of sprocket 96 and into the peeler rolls where they are peeled.

While this invention has been described in detail with particular reference to preferred embodiments thereof, it will be understood that variations and modifications can be effected within the spirit and scope of the invention as described hereinbefore and as defined in the appended claims.

What is claimed is:

1. A method of processing poultry gizzards comprising placing the gizzards with entrails attached on a pair of closely spaced parallel helically threaded conveyor rolls and rotating the conveyor rolls in opposite directions of rotation to move the gizzards along the upper surfaces of the conveyor rolls with the entrails suspended downwardly from the gizzards between the conveyor rolls until the gizzards reach the ends of the conveyor rolls, moving the gizzards from the helically threaded conveyor rolls along a pair of engaged parallel helically threaded cutting rolls which are aligned with the conveyor rolls to separate the entrails from the gizzards, engaging the upwardly facing surfaces of the gizzards moving along the cutting rolls with a first chain conveyor extending over and beyond the cutting rolls, engaging the downwardly facing surfaces of the gizzards with a second chain conveyor and moving the gizzards with the second chain conveyor beneath and along a knife, urging the portions of the gizzards on opposite sides of the knife downwardly to spread the cut apart portions of the gizzard as the gizzards are moved along and cut by the knife, removing debris from the gizzards, and peeling the lining from the gizzards.

2. The method of claim 1 and further including the step of transferring the gizzards from the first chain conveyor to the second chain conveyor comprises moving the gizzards off the cutting rolls into a transfer trough, and fluming gizzards through the transfer trough to the second chain conveyor.

3. The method of claim 1 and wherein the step of removing debris from the gizzards comprises engaging the cut apart portions of the gizzards with moving bristles of brushes.

4. The method of claim 1 and wherein the step of moving the gizzards with the second chain conveyor beneath and along a knife comprises moving the gizzards into contact with and along a sharpened cutting edge of a disc knife and continuing the movement of the gizzards along an unsharpened length of a guide rail aligned with the knife with the cut portions of the gizzards straddling the guide rail.

5. A method of processing poultry gizzards comprising placing the gizzards with entrails attached on a pair of closely spaced parallel helically threaded conveyor rolls with a pair of engaged parallel helically threaded cutting rolls rigidly attached at the ends of the conveyor rolls, rotating one of said conveyor rolls so that its cutting roll causes the other cutting roll and conveyor roll to rotate in the opposite direction of rotation to move the gizzards freely along the upper surfaces of the conveyor rolls, orienting the gizzards as they move along the conveyor rolls with the entrails suspended downwardly from the gizzards between the conveyor rolls and with the portion of the gizzards connected to the entrails oriented downwardly, engaging and moving the upper portions of the gizzards so as to move the lower portions of the gizzards from the conveyor rolls along the cutting rolls, separating the entrails from the gizzards as the gizzards move across the cutting rolls, dropping the gizzards off the cutting rolls into a flume, and moving the gizzards with the flume substantially without reorienting the gizzards to a cutting blade, engaging and moving the lower portions of the gizzards so as to move the upper portions of the gizzards along the cutting blade, and cutting with the cutting blade downwardly into the gizzards.

6. The method of claim 5 and wherein the steps of engaging and moving the lower portions of the gizzards and cutting downwardly into the gizzards comprises moving the gizzards with a conveyor chain along the sharpened edge of a downwardly facing knife and urging the upper portions of the gizzards on opposite sides of the cutting edge downwardly to progressively spread apart the cut apart portions of the gizzards as the gizzards are cut from above by the cutting edge.

7. The method of claim 5 and wherein the step of cutting downwardly into the gizzards comprises moving the gizzards with a conveyor chain first beneath and along the length of a bifurcated presser fork, and then further along the presser fork and beneath and along the sharpened edge protruding downwardly between the tines of the presser fork, and then further along the presser fork beyond the sharpened edge and along an unsharpened guide rail aligned with the sharpened edge with the cut apart portions of the gizzards straddling the guide rail.

8. A method of processing poultry gizzards comprising moving gizzards in sequence on a chain conveyor beneath a presser fork extending along the path of the conveyor, and as the gizzards move beneath the presser fork engaging the upper portions of the gizzards with the presser fork, engaging and cutting into the upper portions of the gizzards with a cutting edge extending downwardly through the presser fork, engaging the gizzards with an unsharpened guide rail extending downwardly through the presser fork and aligned with the cutting edge so that the cut apart portions of the gizzards straddle the guide rail, and continuing the movement of the gizzards along the guide rail after the gizzards move beyond the presser fork.

9. The method of claim 8 and wherein the step of engaging the upper portions of the gizzards with the presser fork comprises urging the portions of the gizzards on opposite sides of the cutting edge downwardly with the presser fork.

10. Apparatus for processing poultry gizzards comprising a pair of closely spaced parallel helically threaded conveyor rolls, a pair of engaged parallel helically threaded cutting rolls, each said cutting roll being joined to and coextensive with a conveyor roll, means for rotating one of said conveyor rolls whereby the cutting roll of the rotated conveyor roll rotates the other cutting roll and conveyor roll, a first chain conveyor including a lower flight extending over and along said cutting rolls for engaging gizzards on said conveyor rolls and moving the gizzards across and beyond said cutting rolls, a stationary cutting edge, a second chain conveyor including an upper flight for receiving gizzards from said first chain conveyor and moving the gizzards into engagement with and along said cutting edge, a bifurcated presser fork straddling said cutting edge and positioned over the upper flight of said second chain conveyor for engaging the portions of said gizzards on opposite sides of the cutting edge, and an unsharpened guide rail extending in alignment with said cutting edge and extending downwardly through said presser fork and extending parallel to the path of the upper flight of said second conveyor beyond said presser fork for receiving and guiding the gizzards in straddled relationship about the guide rail.

11. The apparatus of claim 10 and wherein said presser fork is pivotally supported at one of its end portions and is biased by gravity downwardly toward said conveyor.

12. The apparatus of claim 10 and further including a pair of brush rolls positioned on opposite sides of said cutting edge, means for rotating said brush rolls in opposite directions of rotation, said guide rail extending from said cutting edge and between said brush rolls, and said conveyor chain extending from beneath said cutting edge and beneath said guide rail whereby the gizzards are moved by the conveyor chain first along the cutting edge and then along the guide rail between the brush rolls.

13. Apparatus for processing poultry gizzards comprising a chain conveyor with an upper flight for moving gizzards in series along a processing path, a cutting blade extending along the upper flight of said chain conveyor, said cutting blade including a sharpened edge portion facing said upper flight of said chain conveyor and a guide rail coextensive with said sharpened edge portion, a bifurcated presser fork straddling said cutting blade at said sharpened edge portion and extending along a portion of said guide rail, and a pair of brush rolls positioned on opposite sides of the guide rail of said cutting blade beyond the position of said presser fork for brushing against the gizzards moving along said guide rail, and means for rotating said brush rolls in opposite directions of rotation.

14. The apparatus of claim 13 and further including means for pivotally mounting said presser fork at one of its ends about said cutting blade.

15. The apparatus of claim 13 and wherein said presser fork includes tines positioned on opposite sides of said cutting blade, said tines being downwardly sloped in front of said cutting blade to urge the gizzards into contact with said chain conveyor, with the distal ends of said tines positioned on opposite sides of the sharpened edge urged downwardly toward said chain conveyor.

* * * * *